(12) United States Patent
Sarkis

(10) Patent No.: US 8,742,982 B2
(45) Date of Patent: Jun. 3, 2014

(54) INDIRECT RADAR HOLOGRAPHY APPARATUS AND CORRESPONDING METHOD

(75) Inventor: Michel Sarkis, Stuttgart (DE)

(73) Assignee: Sony Corporation, Tokyo (JP)

( * ) Notice: Subject to any disclaimer, the term of this patent is extended or adjusted under 35 U.S.C. 154(b) by 559 days.

(21) Appl. No.: 13/032,120

(22) Filed: Feb. 22, 2011

(65) Prior Publication Data

US 2011/0241934 A1    Oct. 6, 2011

(30) Foreign Application Priority Data

Mar. 30, 2010  (EP) .................................. 10158498

(51) Int. Cl.
*G01S 13/00* (2006.01)
*G02B 26/10* (2006.01)

(52) U.S. Cl.
USPC ........................................ 342/179; 250/334

(58) Field of Classification Search
USPC .......... 342/179, 185, 191, 192; 356/317, 451, 356/479; 250/332, 334
See application file for complete search history.

(56) References Cited

U.S. PATENT DOCUMENTS

| | | | | |
|---|---|---|---|---|
| 5,485,009 | A * | 1/1996 | Meyzonnetie et al. | 356/5.09 |
| 5,713,364 | A * | 2/1998 | DeBaryshe et al. | 600/476 |
| 7,283,231 | B2 | 10/2007 | Brady et al. | |
| 7,889,348 | B2 * | 2/2011 | Tearney et al. | 356/451 |
| 2003/0071119 | A1 * | 4/2003 | Tsikos et al. | 235/434 |
| 2006/0029279 | A1 | 2/2006 | Donoho | |
| 2008/0228446 | A1 | 9/2008 | Baraniuk et al. | |

FOREIGN PATENT DOCUMENTS

WO    WO 02/23205 A1    3/2002

OTHER PUBLICATIONS

U.S. Appl. No. 13/053,808, filed Mar. 22, 2011, Nogueira-Nine.
David Smith, et al., "Microwave Indirect Holographic Imaging Using an Adaptation of Optical Techniques", IEEE Microwave and Wireless Components Letters, vol. 13, No. 9, Sep. 2003, pp. 379-381.
D. Smith, et al., "A Novel Technique for the Determination of the Radiation Patterns of Medium Gain Antennas from Scalar Intensity Measurements", In International Symposium on Antennas, Propagation and EM Theory, Nov. 2003, pp. 373-376.
D. Smith, et al., "Imaging Dielectric Objects from Scalar Intensity Patterns by means of Indirect Holography", In IEEE Antennas and Propagation Society International Symposium, Jul. 2005, pp. 177-180.

(Continued)

*Primary Examiner* — Dao Phan
(74) *Attorney, Agent, or Firm* — Oblon, Spivak, McClelland, Maier & Neustadt, L.L.P.

(57) ABSTRACT

An indirect radar holography apparatus for scanning a scene and generating a high-density signal pattern representing the scene. The apparatus illuminates the scene with radiation according to an illumination signal; generates a reference signal from the illumination signal; detects radiation emitted in a predetermined spectral range from a spot of the scene; generates a radiation signal per spot from the detected radiation; performs control so that radiation is detected at a number of spots distributed over the scene, the number being lower than the number of intensity signals of the high-density signal pattern; combines the radiation signals generated from the detected radiation and the reference signals to obtain a low-density signal pattern of intensity signals; and processes the intensity signals of said low-density signal pattern to generate the high-density signal pattern by applying compressive sensing to the low-density signal pattern.

18 Claims, 5 Drawing Sheets

(56) References Cited

OTHER PUBLICATIONS

D. Smith, et al., "3D Microwave Imaging for Medical and Security Applications", 2006 International RF and Microwave Conference Proceedings, Sep. 2006, pp. 233-237.

D. Smith, et al., "Indirect Holographic Techniques for Determining Antenna Radiation Characteristics and Imaging Aperture Fields", IEEE Antennas and Propagation Magazine, vol. 49, No. 1, Feb. 2007, pp. 54-67.

D. J. Brady, et al., "Compressive Holography", Optics Express, vol. 17, No. 15, Jul. 2009, pp. 13040-13049.

Yahya Rahmat-Samii, "UCLA's New Bi-polar Planar Near-field Antenna Measuremet Facility", In IEEE Aerospace Applications Conference, Feb. 1995, pp. 169-196.

David L. Donoho, "Compressed Sensing", IEEE Transactions on Information Theory, Apr. 2006, 34 pages.

Emmanuel Candes, et al., "Robust Uncertainty Principles: Exact Signal Reconstruction from Highly Incomplete Frequency Information", IEEE Transactions on Information Theory, Feb. 2006, 41 pages.

F. D'Agostino, et al., "The Unified Theory of Near-Field-Far-Field Transformations with Spiral Scannings for Nonspherical Antennas", Progress in Electromagnetics Research B, vol. 14, 2009, pp. 449-477.

* cited by examiner

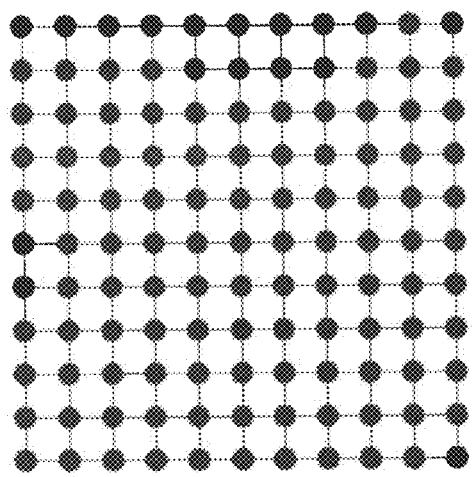
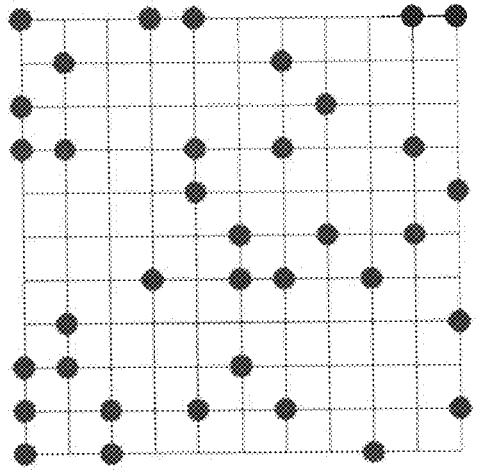
FIG. 3A                FIG. 3B
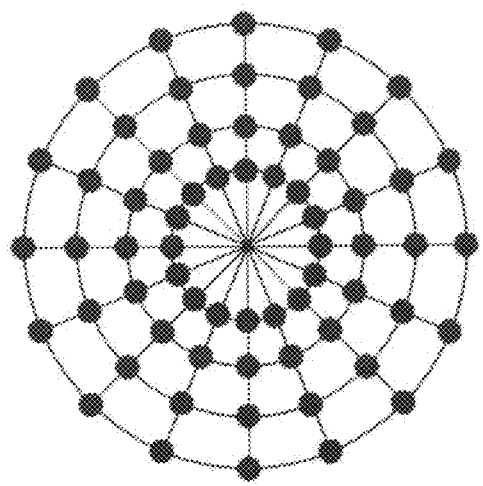
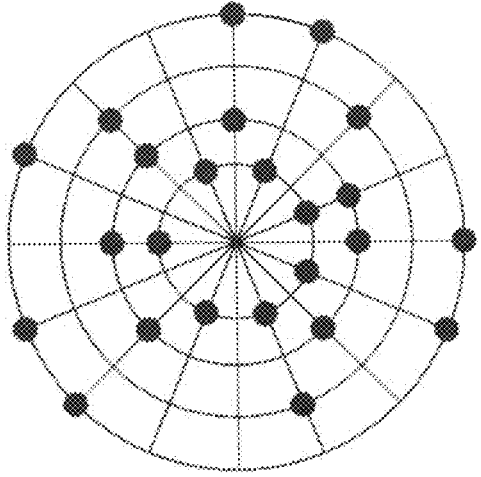
FIG. 4A                FIG. 4B

INDIRECT RADAR HOLOGRAPHY APPARATUS AND CORRESPONDING METHOD

CROSS-REFERENCE TO RELATED APPLICATIONS

The present application claims priority of European patent application 10158498.5 filed on Mar. 30, 2010.

FIELD OF THE INVENTION

The present invention relates to an indirect radar holography apparatus and a corresponding method for scanning a scene. Further, the present invention relates to a computer program for implementing said method and a computer readable non-transitory medium carrying a computer program for implementing said method and

BACKGROUND OF THE INVENTION

Microwave imaging is an area of much current attention for a variety of applications. In the security area the use of microwave and millimeter wave imaging systems offers the potential for providing a non-ionising technique capable of producing high quality images of concealed objects in a fast and inexpensive manner. Most current systems use amplitude and phase measurements using a vector network analyzer to produce images of target objects. In the medical area the ability of microwaves to penetrate to considerable depths beneath the skin in a non-ionising safe manner coupled with the large differences in material properties between healthy and malignant tissues has also stimulated much research interest.

Indirect radar holography is a method to construct 2D or 3D images from some intensity measurements. The advantage of this principle over direct holography is that only a simple diode detector for power measurement is needed to measure the output of the antenna and not a vector analyzer (to measure amplitude and phase). In indirect holography, the intensity pattern of the antenna is measured over an area of pre-defined size. The samples of the intensity pattern are taken over a grid of a pre-defined density. Increasing the density of the grid (intensity measurements) increases the resolution and the accuracy of the image. However, increasing the density of the measurements has some disadvantage of causing a delay and increase in complexity in the acquisition process. In case of a single receiving antenna, the antenna has to be moved to more positions, which requires also more hardware precision. In case of an antenna array, achieving better resolution requires a higher number of antenna elements and more samples (measurements) to be taken.

A microwave indirect holographic measuring method is disclosed in WO 02/23205 A1 and in D. Smith, M. Leach, M. Elsdon and S. J. Foti, "Imaging Dielectric Objects from Scalar Intensity Patterns by means of Indirect Holography", IEEE Antennas and Propagation Society International Symposium, July 2005. A first electrical signal of microwave frequency is provided. A first part of the first signal is directed to a first antenna. Predetermined changes of phase and amplitude are applied to a second part of the first signal to produce a second electrical signal, which is coherent with the first part of the first signal. Microwave radiation is detected at a plurality of locations by means of a second antenna to generate a third electrical signal at each location. The second and third electrical signals are combined to produce a fourth electrical signal. As a result, a hologram of the radiation pattern observed at the sampling antenna can be produced, which avoids the necessity for a network analyser. This reduces the cost of equipment for carrying out the method, and also enables the apparatus to operate over a wider range of frequencies or even simultaneous operation at multiple frequencies, which in turn broadens the range of applications of the method.

However, there is still a need for a technique that accelerates the acquisition process in indirect holography and provides simultaneously high resolution intensity measurements.

BRIEF SUMMARY OF THE INVENTION

It is an object of the present invention to provide an indirect radar holography apparatus for scanning a scene having a reduced acquisition time and/or having an increased resolution compared to known apparatus. It is a further object of the present invention to provide a corresponding method as well as a corresponding computer readable non-transitory medium carrying a computer program for implementing said method on a computer.

According to an aspect of the present invention there is provided an indirect radar holography apparatus for scanning a scene and generating a high-density signal pattern representing said scene, said apparatus comprising:
  an illumination means for illuminating said scene with radiation according to an illumination signal,
  a reference signal generation means for generating a reference signal from said illumination signal,
  a radiation detection means for detecting radiation emitted in a predetermined spectral range from a spot of said scene and for generating a radiation signal per spot from said detected radiation,
  a control means for controlling said illumination means and/or said radiation detection means so that radiation is detected at a number of spots distributed over the scene, wherein said number is lower than the number of intensity signals of said high-density signal pattern,
  a signal combination means for combining said radiation signals generated from the radiation detected at said number of spots and said reference signals to obtain a low-density signal pattern of intensity signals, and
  a processing means for processing the intensity signals of said low-density signal pattern and for generating said high-density signal pattern by applying compressive sensing to said low-density signal pattern.

According to a further aspect of the present invention there is provided a corresponding indirect radar holography method. According to still a further aspect the present invention provides a computer readable non-transitory medium having instructions stored thereon which, when carried out on a computer, cause the computer to perform said steps of controlling, combining and processing of the indirect radar holography method according to the present invention.

Preferred embodiments of the invention are defined in the dependent claims. It shall be understood that the claimed method and the claimed non-transitory medium have similar and/or identical preferred embodiments as the claimed apparatus and as defined in the dependent claims.

To accelerate the acquisition process in indirect radar holography, the idea of compressive sensing is applied according to the present invention. Compressed or compressive sensing (CS) is the art of reconstructing a signal from some random measurements ("radiation signals") that directly condense the original signal into a compressed representation. The measurements acquired are condensed in the sense that they are very low in number, which makes further compression not necessary. CS differs from the traditional data acquisition schemes since it does not follow the "sample first—then compress" framework. However, to reconstruct, for instance, an image from the (reduced number of) measurement, the original signal needs to be reconstructed first from said (reduced number of) measurements.

Further, according to the present invention an apparatus and a method are provided that construct complex fields (as generally measured in direct radar holography) from compressed intensity measurements to reduce the costs that are usually incurred in direct radar holography and to simultaneously accelerate the acquisition process of the indirect radar holography apparatus.

To integrate compressive sensing in the acquisition process of indirect holography, sparse intensity measurements, i.e. radiation is detected only at a plurality of (preferably equally) distributed spots across the scene, resulting in a low-density signal pattern, and not—as conventionally done—at all spots across the scene (which may be understood as the entire scene or a predetermined area of interest) resulting in a high-density signal pattern. The sampled spots are acquired according to the present invention in order to accelerate the acquisition process in indirect holography. Further, particularly in case of reconstructing a final image of the scene, as proposed according to an embodiment of the present invention, the high-density signal pattern is derived from the sparse measurements.

Conventional approaches for sampling signals or imaging follow the Shannon's theorem, which establishes that the sampling rate must be at least twice the maximum frequency present in the signal (also called Nyquist rate). This principle has been applied in nearly all signal acquisition protocols used in consumer audio or image electronics, medical imaging devices, digital communications, etc. When the signal is bandlimited, as it used to be in the digital communications field, to convert the analog signals into the digital domain requires the usage of analog-to-digital converters (ADCs), sampling at or above the Nyquist rate, which implicitly imposes a dependency of such systems on the ADC capabilities. For other signals like images, the required sampling rate is not dictated by the Shannon's theorem but by the desired temporal or spatial resolution. However, it is common to such systems to use antialiasing low-pass filters to bandlimit the signal before sampling, and then the Nyquist rate plays also here an important role.

The compressive sensing paradigm, as described, for instance, in E. Candes, J. Romberg, and T. Tao, "Robust uncertainty principles: Exact signal reconstruction from highly incomplete frequency information," IEEE Transactions on Information Theory, vol. 52, pp. 489-509, 2006 or D. Donoho, "Compressed sensing," IEEE Transactions on Information Theory, vol. 52, pp. 1289-1306, 2006, goes against that common wisdom in data acquisition, by asserting that it is possible to recover certain signals and images from far fewer samples or measurements than those required from the traditional methods. In contrast to the conventional sampling theorem, which assumes that the amount of information in a signal is proportional to its frequency content, compressive sensing proposes a new sampling paradigm in which the information content of the signal is determined by its sparsity level or by its degree of freedom. From this point of view, the signal of interest does not need to be sampled at Nyquist rate, but at its information rate, which—in most of the cases—is much less than its bandwidth.

Briefly summarized, the compressive sensing paradigm establishes that if a signal or image is sparse enough in some known domain, it can be reconstructed from a very few number of samples (much less than what Nyquist specifies), as far as the acquisition process can be randomized in some sense. Hence, the present invention proposes to reduce the scanning/imaging time of an indirect radar holographic apparatus by applying compressive sensing. Consequently, the compressive sensing technology is applied in the processing of the acquired irregular pattern of intensity signals leading to the desired advantages over the known indirect radar holographic devices and methods, in particular leading to the desired reduction in the scanning time and/or the desired increase in the resolution of an image that can be reconstructed from the processed intensity signals.

To apply such the compressive sensing technique it is necessary first of all to find a measurements domain where the image has a sparse representation. Unfortunately the images obtained by an indirect radar holography device are not sparse in the acquisition domain of the radar, which is the intensity pattern captured by the radiation detector. Therefore the acquired intensity pattern, which is also called hologram, is mapped into a sparse domain. One characteristic of the hologram being considered here is that they are piecewise constant, and therefore one possibility is to use the total variation technique, as proposed according to an embodiment, for recovering the hologram from a small number of measurements, but other transformations are also possible.

The second condition to successfully apply compressive sensing is that the way the measurements are done (i.e. a measurement matrix) has to be incoherent with the representation basis being used (i.e. a representation matrix). The coherence measures the largest correlation between any two elements in these two matrices. One way to ensure this condition is to select a (pseudo-)random matrix as a measurement matrix, i.e. to randomize the acquisition process. Other measurement matrices are also possible, and depending upon the scene to be scanned a customized measurement matrix could have better incoherence than a randomly selected one. However a random one is generic and scene independent.

The solution proposed according to the present invention is to reduce the imaging scanning time by undersampling the scene of interest, i.e. by taking fewer samples than in a standard acquisition process and not at all spots, and then process the samples (e.g. reconstruct the hologram) by applying compressive sensing using its sparse representation (like, for example, total variation). In other words, according to an element of the present invention, the spot at which radiation is detected from the scene is moved from one position to another position so that radiation is detected at a number of spots (preferably equally) distributed over the scene, but at less than all spots as is conventionally done.

Hence, different from the conventional methods, according to which a high-density signal pattern is obtained from the radiation signals detected at a large number of spots (i.e. generally all spots), according to the present invention a low-density signal pattern is obtained from the detected radiation signals combined with the reference signals. In this context "high" and "low" shall be understood to express the relative relationship that the low-density signal pattern comprises less pattern signals than the high-density signal pattern. For instance, if an image having a resolution of n×n shall be reconstructed, i.e. if the high-density signal pattern comprises N=n×n signals, radiations signals are detected at less than N spots, i.e. the low-density signal pattern comprises (only) M<N radiation signals.

Consequently, the compressive sensing technology can be applied in the reconstruction process of the image leading to the desired advantages over the known indirect radar holography imaging devices and methods, in particular leading to the desired reduction in the scanning time.

In this context, to move the spot over the scene shall be understood such that a movement over a predetermined area of the scene, e.g. an area of interest where an object (e.g. a person) to be scanned is placed, is included as well. In such a situation the spot is moved from one position to another position so that radiation is detected at a plurality of spots distributed over said predetermined area of scene, but at less than all spots of said predetermined area.

According to a preferred embodiment the processing means is adapted for applying a l1-norm minimization algorithm to said intensity signals. The l1-norm is generally known, and the l1-norm problem (also called least absolute deviations (LAD), least absolute errors (LAE), least absolute value (LAV)) is a mathematical optimization technique similar to the popular least squares technique (l2-norm) that attempts to find a function which closely approximates set of data. In the simple case of a set of (x,y) data, the approximation function is a simple "trend line" in 2D Cartesian coordinates. The proposed method thus minimizes the sum of absolute errors (SAE) or some of "residuals" between points generated by the function and corresponding points in the data.

Applying the l1-norm minimization according to an embodiment of the present invention enables to recover an image of the scanned scene from the detected radiation signals, which are sparse in a known domain.

In an embodiment said control means is adapted for controlling said illumination means and/or said radiation detection means so that radiation is detected at a number of spots irregularly distributed over the scene. In this context "irregular" shall be understood such that the spots from which radiation is detected are not located at equal distances in at least one direction (preferably in both directions) of the sampling grid (e.g. Cartesian grid). By such an irregular detection a certain degree of randomness is achieved as required for applying the compressive sensing technique.

According to a further embodiment the processing means is adapted for reconstructing a regular sampled signal pattern of intensity signals from said sampled signal pattern of irregularly sampled intensity signals. This is, for instance, done by applying a total variation operator on the irregular (low-density) pattern of intensity signals, while other sparsifying transformations can be applied as well. The obtained, high-density pattern of intensity signals can then be used for further processing, e.g. for image reconstruction.

Preferably, the reference signal generation means is adapted for applying predetermined changes of phase, in particular of phase and amplitude, to said illumination signal for generating said reference signal. The simplest form of the reference signal is a linearly phase shifted wave of that of the illuminating signal from the illumination unit. However, according to this preferred embodiment a coherently generated reference signal from the illuminating signal is obtained, which, after combination with the detected radiation signals (generally a complex field scattered by the scanned object, i.e. the scene) results in the desired intensity pattern.

In a preferred embodiment the signal combination means is adapted for adding the radiation signals and said reference signal and for squaring said sum. This provides the ability to easily filter off unwanted terms, in particular by applying a Fourier transform on the sum, filtering off the unwanted terms, centralising the wanted terms and applying an Inverse Fourier transform on the centralised wanted terms. The result then is the original scattered field of the object in the measurement plane.

Preferably, in an embodiment reconstruction means for reconstructing an image from said processed intensity signals are provided. In a possible implementation a known back propagation algorithm is used for said reconstruction. Said reconstruction means (and/or the processing means) may comprise, for instance, regridding means and/or interpolation means for transforming said processed intensity signals into intensity signals on a sampling (e.g. Cartesian) grid to enable the reconstruction by use of conventional reconstruction methods working with samples on such a sampling (e.g. Cartesian) grid. However, if other reconstruction methods are available that, for instance, can reconstruct an image from samples on a different pattern, e.g. a polar coordinate pattern, the regridding and/or interpolation may be omitted.

For effecting a movement of the spot to various distributed positions of said scene, from which the radiation is detected, spot movement means are provided, for which various embodiments exist. According to one embodiment mechanic spot movement means are provided for effecting a relative movement of the illumination means and/or the radiation detection means with respect to the scene for effecting a movement of said spot, in particular for mechanically moving the illumination means and/or the radiation detection means for effecting a movement of said spot. For instance, at least one motor may be provided by which an antenna of the illumination means and/or the radiation detection means is moved or by which the orientation of the antenna is varied, preferably in two dimensions. According to another embodiment at least one rotating mirror may be provided for changing the direction of the sensitivity profile of the illumination means and/or the radiation detection means.

According to another embodiment electronic spot movement means are provided for electronically moving the sensitivity profile of the illumination means and/or the radiation detection means. Such an embodiment may be implemented, for instance, by an electronic beam positioning means or an electronic beam forming means, which has the advantage that no mechanical means are provided and which generally is able to more quickly move the sensitivity profile of the illumination means and/or the radiation detection means compared to mechanical spot movement means.

Preferably, according to another embodiment, the spot movement means is adapted for effecting a movement of the spot such that the scene is completely scanned, in particular that the spot is sequentially moved over said scene along a continuous trajectory. Thus, no jumps of the spot to distinct, in particular not neighbouring positions on the scene are required which would increase the time for the complete acquisition of radiation signals. A continuous trajectory may be differently implemented, for instance by a meandering trajectory according to which the spot scans over the scene line by line or column by column.

As mentioned above, it is important for application of the compressive sensing technique that the radiation signals obtained from scanning the scene have a sparse representation in a know domain. For the applications envisaged by the present invention said known domain is preferably a total variation domain, a Fourier domain, wavelets domain, curvelets domain or any combination.

In another embodiment a memory is provided for storing one or more lists of positions of spots, from which radiation shall be detected, wherein said control means is adapted for selecting the positions of said plurality of distributed spots from one of said lists. Alternatively, position generation means may be provided for determining the positions of said plurality of irregularly distributed spots by use of a predetermined function or sampling distribution, in particular a uniform Bernoulli or Gaussian distribution, i.e. the positions are generated on the fly by use of a generator, e.g. a processor, for calculating the positions. For instance, a pseudo-random number generator can be applied for implementing said embodiment.

For implementing the present invention is sufficient that the illumination means comprises a single illumination unit or a line or array of illumination units, in particular a single illumination antenna or a line or array of illumination antennas, for illuminating said scene with radiation. In other words, each of the illumination units illuminates a different spot, from which the radiation can then be detected. Similarly, in an embodiment radiation detection means comprises a single radiation detection unit or a line or array of radiation detection units, in particular a single radiation detection antenna or a line or array of radiation detection antennas, for detecting radiation emitted from a single spot or from a line or array of spots. Hence, each of said radiation detection units detects radiation from a different spot. In this way, radiation from a number (e.g. a line or array) of pixels is simultaneously detected.

Preferably, said illumination units and/or said radiation detection units, respectively, are simultaneously and equally moved or their sensitivity profiles are simultaneously and equally changed. Generally, however, it is also possible that each unit is individually controlled and that their spots are individually (and differently) moved.

In another embodiment said control means is adapted for controlling said illumination means and/or said radiation detection means so that the number of radiation signals of said low-density signal pattern is by a factor in the range from 10% to 90%, in particular in the range from 25% to 75%, lower than the number of intensity signals of said high-density pattern. Hence, compared to conventional radiation detection, according to this embodiment radiation is detected at more than 10%, in particular more that 25%, of all spots, but less than 90%, in particular less than 75% of all spots. For instance, radiation signals may be acquired at approximately 50% of the spots resulting in a fairly good image quality of a reconstructed image. Generally, there is a trade-off between the number of spots from which radiation is acquired (i.e. the reduction of acquisition time) and the desired quality of the results of data acquisition and data processing.

Preferably, the illumination means is adapted for emitting and the radiation detection means is adapted for detecting radiation emitted in a microwave frequency range, in particular in a frequency range from 100 MHz to 10 THz, preferably from 10 to 300 GHz. As mentioned above, this frequency range has the ability to penetrate non-metal materials, including plastics, walls, clothes, smoke and fog, which is an important property for applications of the presented device and method. Particularly the achievable spatial resolution of few millimeters is very interesting in security applications like concealed weapon or explosives detection, or in medical applications, e.g. for imaging breast cancer tumours. Generally, the invention is also applicable for other frequency ranges. However, some frequencies are less or not usable due to atmosphere absorption properties (i.e. where the propagation attenuation is too high to receive some useful signal).

According to still another aspect the present invention provides an indirect radar holography apparatus for scanning a scene and generating a high-density signal pattern representing said scene, said apparatus comprising:

an illuminator that illuminates said scene with radiation according to an illumination signal,
a reference signal generator that generates a reference signal from said illumination signal,
a radiation detector that detects radiation emitted in a predetermined spectral range from a spot of said scene and generates a radiation signal per spot from said detected radiation,
a controller that controls said illuminator and/or said radiation detector so that radiation is detected at a number of spots distributed over the scene, wherein said number is lower than the number of intensity signals of said high-density signal pattern,
a signal combiner that combines said radiation signals generated from the radiation detected at said number of spots and said reference signals to obtain a low-density signal pattern of intensity signals, and
a processor that processes the intensity signals of said low-density signal pattern and generates said high-density signal pattern by applying compressive sensing to said low-density signal pattern.

BRIEF DESCRIPTION OF THE DRAWINGS

These and other aspects of the present invention will be apparent from and explained in more detail below with reference to the embodiments described hereinafter. In the following drawings FIG. 3 shows a diagram illustrating a dense and an irregular rectangular scanning pattern, FIG. 4 shows a diagram illustrating a dense and a sparse polar scanning pattern.

DETAILED DESCRIPTION OF THE INVENTION

Figure 1:
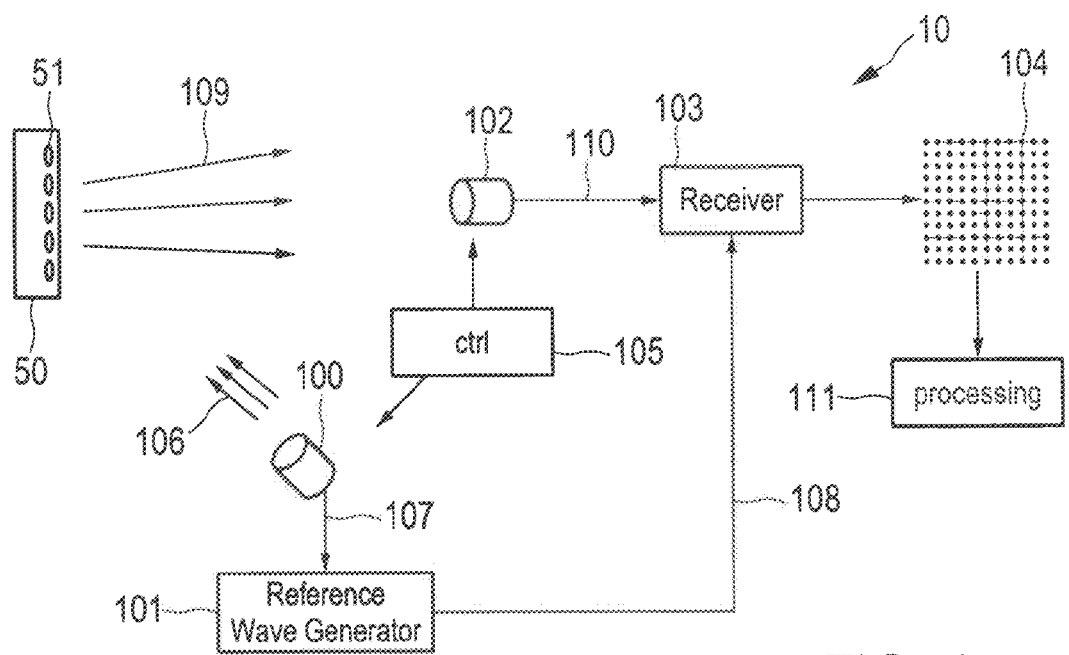
FIG. 1 shows a schematic block diagram of a known an indirect radar holography apparatus.

An embodiment of an indirect radar holography apparatus 10, as for instance similarly disclosed in WO 02/23205 A1 and in D. Smith, M. Leach, M. Elsdon and S. J. Foti, "Imaging Dielectric Objects from Scalar Intensity Patterns by means of Indirect Holography", IEEE Antennas and Propagation Society International Symposium, July 2005 is shown in FIG. 1. Indirect holography differs from direct holography since the images are constructed using scalar intensity measurements, which can be performed using, for instance, diode detectors, while in direct holography complex fields are measured using a vector network analyzer.

The indirect radar holography apparatus 10 shown in FIG. 1 comprises an illumination means, in this embodiment a single illumination antenna 100, for illuminating a scene 50, e.g. an object such as a person, with radiation 106 according to an illumination signal 107. A reference signal generation means 101, e.g. a reference wave generator, is provided for generating at least one reference signal 108 from said illumination signal 107. By a radiation detection means 102, e.g. a detection (or sampling) antenna, radiation 109 emitted in a predetermined spectral range from a spot 51 of said scene 50 is detected, and a radiation signal 110 is generated per spot 51 from said detected radiation 109. For controlling said illumination means 102 and/or said radiation detection means 100 a control unit 105 is provided so that radiation is detected at a plurality of (regularly distributed) spots 51, i.e. the spots that are aligned according to a regular pattern over said scene 50.

Further, a signal combination means 103, e.g. a hybrid tee, is provided for combining said radiation signals 110 generated from the radiation 109 detected at said plurality of irregularly distributed spots 51 and said at least one reference signal 108 to obtain a (high-density) pattern of intensity signals 104, which can be further processed, e.g. from which an image can be reconstructed.

Hence, indirect holography comprises two main parts. The first part is to record the scalar intensity pattern 104 of the detection antenna or the hologram. It is produced by combining the complex fields measured using the detection antenna 102 with a coherent generated reference signal 108 in the combination unit 103 (also called "receiver") block. The combination of both signals generates the intensity pattern or the hologram. The intensity pattern I(x,y) is sampled in a plane rectangular grid 104 of a predefined size and density.

Once the intensity pattern is obtained, the second part refers to the processing of the intensity pattern in a processing means 111. Said processing may employ a Fourier transformation followed by some filtering operations to recover the original complex field E(x,y). Having done that, indirect holography continues like direct holography. In other words, for instance a near-field to far-field transformation is conducted to construct the image E(x,y,z) at a specified distance z from the detection antenna 102. Examples of near-field to far-field transformations are the algorithms well known and described in Y. R-Samii, "UCLA's New Bi-Polar Planar Near-Field Antenna Measurement Facility", In IEEE Aerospace Applications Conference, February 1995, which is herewith incorporated herein, but will not be described herein in more detail.

To enhance the quality and the resolution of the constructed image E(x,y,z), the intensity pattern I(x,y) should be denser. In other words, the sampling grid 104, at which I(x,y) is defined as shown in FIG. 1, should be denser or finer. This requires that the detection antenna 102 samples the intensity pattern at much more positions which will cause a lot of delays in the acquisition process. This is, however, not done according to the present invention, but the invention proposes a different approach to shorten the acquisition time and/or increase the resolution.

In the following, $\Phi$ designates a sub-sampling matrix (i.e. a sampling grid having less samples than the conventional sampling grid 104), I designates the matrix of intensity pattern, i is the vector format of I taken by padding its columns, Y is the matrix of measurements and y is the vector format of Y taken by padding its columns.

A first element of the present invention is to design a suitable sub-sampling matrix $\Phi$ that can define the measurements. The sub-sampling matrix should satisfy the properties of compressive sensing, which is applied according to the present invention. One way to do that is to choose a sub-sampling matrix that makes the sampling process act like incoherent aliasing interference or satisfy the restricted isometry property (RIP), as described in the above cited papers of Candes and Donoho. The simplest form of such a matrix that ensures this property is a pseudo-random sampling matrix. In the following, the explanation of the present invention will assume a sampling matrix to be pseudo-random, which also be understood as one form of a "random" sampling matrix. However, it should be noted that any sub-sampling matrix that satisfies the compressive sensing properties, e.g. (RIP), can generally be used in the apparatus and method of the present invention.

Whatever sampling matrix is used, it should follow the mapping defined by $$\Phi \cdot i = y. \quad (1)$$

According to the present invention the measurement vector y that has M elements is gathered. With these measurements, the intensity pattern I that has N elements and where M<<<<N can be reconstructed as will be explained below.

Figure 2:
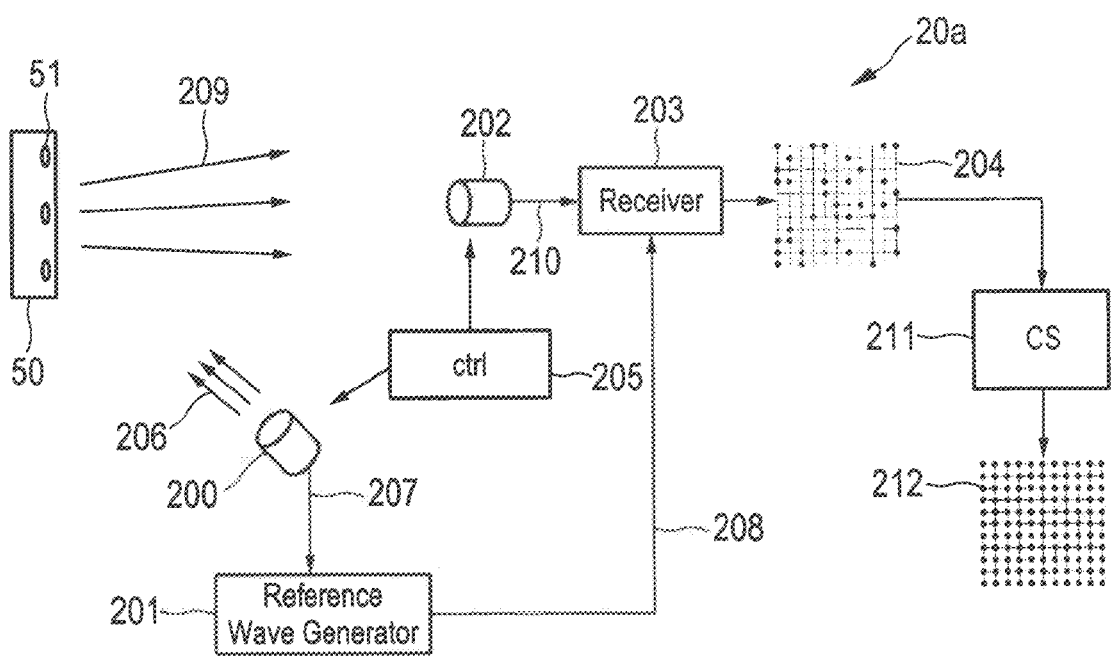
FIG. 2 shows a schematic block diagram of a first embodiment of an indirect radar holography apparatus according to the present invention.

In order to design a suitable or a pseudo-random sub-sampling matrix, several embodiments can be envisaged. FIG. 2 depicts a schematic block diagram of an embodiment 20a of an indirect radar holographic apparatus according to the present invention.

Similarly as shown in FIG. 1, the indirect radar holography apparatus 20a shown in FIG. 2 comprises an illumination means, in this embodiment also a single illumination antenna 200, for illuminating the scene 50, with radiation 206 according to an illumination signal 207. A reference signal generation means 201, e.g. a reference wave generator, is provided for generating at least one reference signal 208 from said illumination signal 207. By a radiation detection means 202, e.g. a detection (or sampling) antenna, radiation 209 emitted in a predetermined spectral range from a spot 51 of said scene 50 is detected, and a radiation signal 210 is generated per spot 51 from said detected radiation 109. For controlling said illumination means 202 and/or said radiation detection means 200 a control unit 205 is provided so that radiation is detected at a number of spots 51 distributed, preferably in an equal manner, over the scene 50, wherein said number is lower than the number of intensity signals of said high-density signal pattern. In this embodiment shown in FIG. 2 said spots 51 are irregularly distributed, i.e. the spots that are not aligned according to a regular sampling pattern over said scene 50, but they are distributed in a irregular sampling manner over the entire scene 50 to be imaged.

Further, a signal combination means ("receiver") 203 is provided for combining said radiation signals 210 generated from the radiation 209 detected at said number of spots and said reference signal 208 to obtain a low-density signal pattern 204 of intensity signals.

According to this embodiment a single illumination antenna 200 and a single detection antenna 202 are provided. One or both of said antennas 200, 202 can be either moved to illuminate or scan, respectively, the intensity pattern or can illuminate or scan, respectively, in combination with at least one moving or rotating reflector or other similar combinations of a single antenna. To acquire the measurement vector y in this case, the antenna can be repositioned or a reflector (not shown) positioned near the antenna can be moved to acquire the samples in a sparse grid 204. Generally, all mechanical and/or electrical means can be used for moving one or both of the antennas or the illumination profile or sensitivity profile, respectively, of one or both of the antennas, by which it is achieved that the entire scene is sampled at various spots in an irregular manner.

To get more insight on this sampling strategy, the case of a plane-rectangular scan is shown in FIG. 3, whereby the same scanning terminologies are used as in the above cited paper of Donoho, which explanations are incorporated herein by reference. In FIG. 3A it is shown how the (dense and regular)

intensity pattern is conventionally acquired. In FIG. 3B one example of a random (sparse and irregular) sampling grid that is acquired according to the present invention using mechanical movements of the illumination or sampling antenna or any other strategy that includes a single antenna, e.g. a moving reflector near one or both of the antennas. It should be noted that the sampling positions in the grids shown in FIG. 3 (and also in FIGS. 4 and 5) are illustrative and not to scale, to understand the principle of the present invention.

Figure 5A:
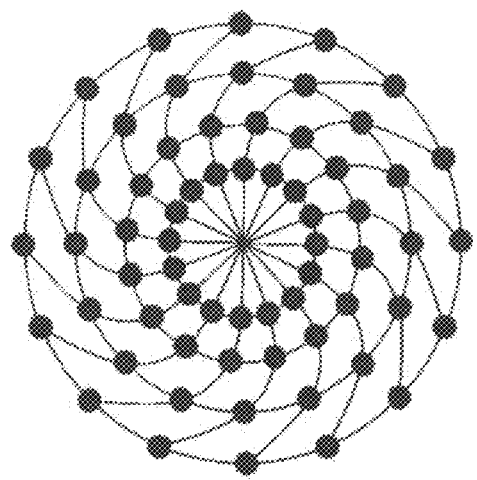
FIG. 5 shows a diagram illustrating a dense and a sparse bi-polar scanning pattern.

To obtain an efficient and fast sampling of the entire scene, e.g. using two motors and a single sampling antenna, it is possible to use the plane-polar scanning pattern shown in FIG. 4A or the bi-polar pattern shown in FIG. 5A. In both figures, these scanning schemes will create an irregular sampling pattern distributed across the entire scene when compared to FIG. 3A. These scanning schemes are easier to realize using hardware, e.g. two motors and a single antenna. In other words, the scanning strategies in FIGS. 4A and 5A are alternative ways to obtain the irregular sampling pattern shown in FIG. 3B. These scanning strategies are only non-limiting examples, but other scanning strategies also exist like spiral scanning or cylindrical scanning and can also be used according to further embodiments of the present invention, as long as they are able to perform the irregular (e.g. random or pseudo-random) sparse sub-sampling distributed along the entire scene or any suitable sub-sampling for compressive sensing in a scanning mode.

Once the random samples are acquired, the dense intensity pattern 212 also shown in FIG. 3A or hologram can be reconstructed in a processing unit 211 as will be explained below.

Figure 5B:
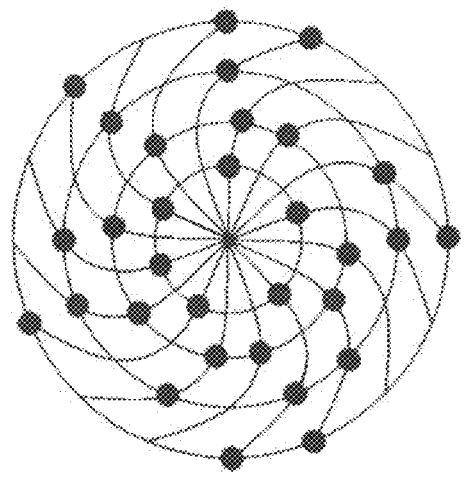

Alternatively, it is possible to scan the scene using the plane-polar or bi-polar patterns but this time in an irregular pattern as shown in FIGS. 4B and 5B respectively. In this case, the plane-polar or the bi-polar patterns are irregularly sampled across the entire plane-polar or bi-polar grids shown in FIG. 4A and FIG. 5A. To obtain the dense intensity pattern 212 also shown in FIG. 3A, there are two embodiments according to the present invention. The first embodiment uses compressed sensing as will be explained below to obtain directly the dense pattern 212 that has a Cartesian grid format. The second embodiment uses compressed sensing twice. The first time is to obtain the dense plane-polar and bi-polar patterns shown in FIG. 4A and FIG. 5A from the irregular sampled one shown in FIGS. 4B and 5B. The second time is to transform the obtained dense plan-polar or bi-polar grids into a dense intensity pattern 212. In further embodiments of the present invention, a similar strategy can be performed using other scanning schemes, like spiral or cylindrical scanning, as explained above.

Figure 6:
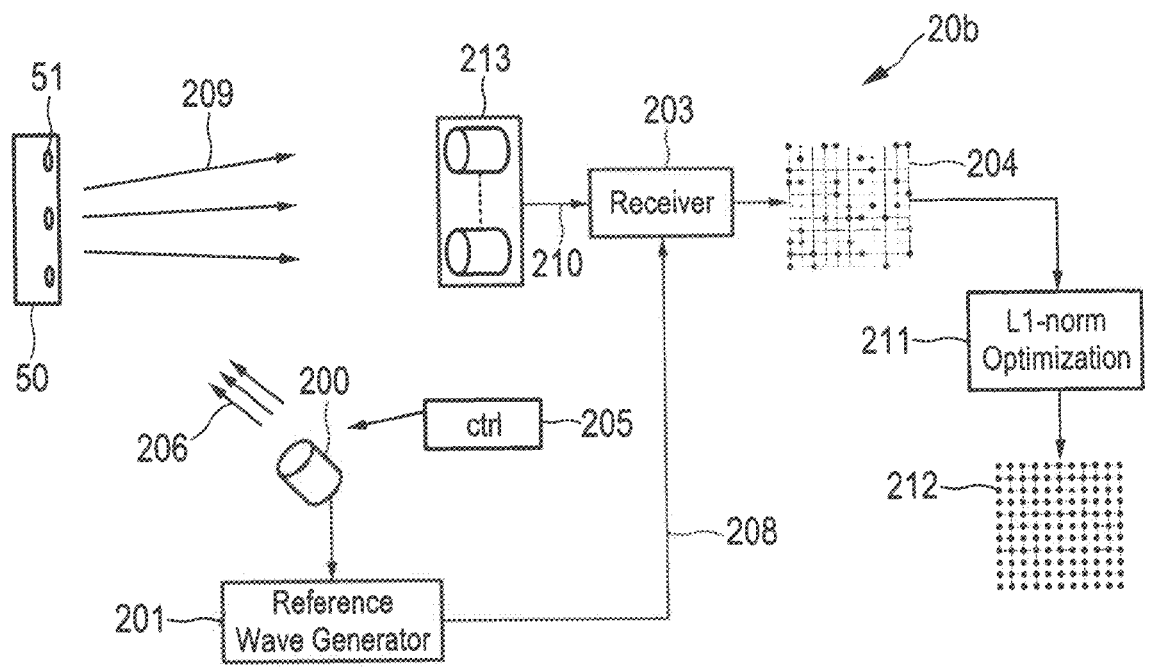
FIG. 6 shows a schematic block diagram of a second embodiment of an indirect radar holography apparatus according to the present invention.

The pseudo-random sub-sampling matrix Φ or a suitable one for compressive sensing can be also designed according to another embodiment of the present invention using a multiple antenna configuration. In FIG. 6 an embodiment 20b of the indirect radar holography apparatus of the present invention with a detection antenna array 213 is shown. The antenna array 213 can, for example, be an electronic beam steering antenna with one receiver as shown in FIG. 6. The invention can also have any equivalent multiple-antenna multiple-receiver design depending on the type and number of antennas used. Whatever configuration used, each measurement of detection antenna will be combined in the receiver unit 203 with at least one reference signal 208 generated by the reference wave generator 201.

To design the sparse sub-sampling matrix Φ, the sampling pattern of the receiving antennas 213 should be designed in an irregular, e.g. pseudo-random format or any other design suitable for compressive sensing. This can be done, for example, by controlling an electronic beam steering antenna with the corresponding sampling pattern, but can be also done by placing the antenna elements in the array 213 in a corresponding configuration. Other embodiments are possible, in particular in which the sub-sampling matrix depends on the number and type of antennas used.

For transforming the sparse (irregularly sampled) intensity pattern 204 into the dense intensity pattern 212 an l1-norm optimization is used according to this embodiment, which optimization will be explained in more detail below.

Figure 7:
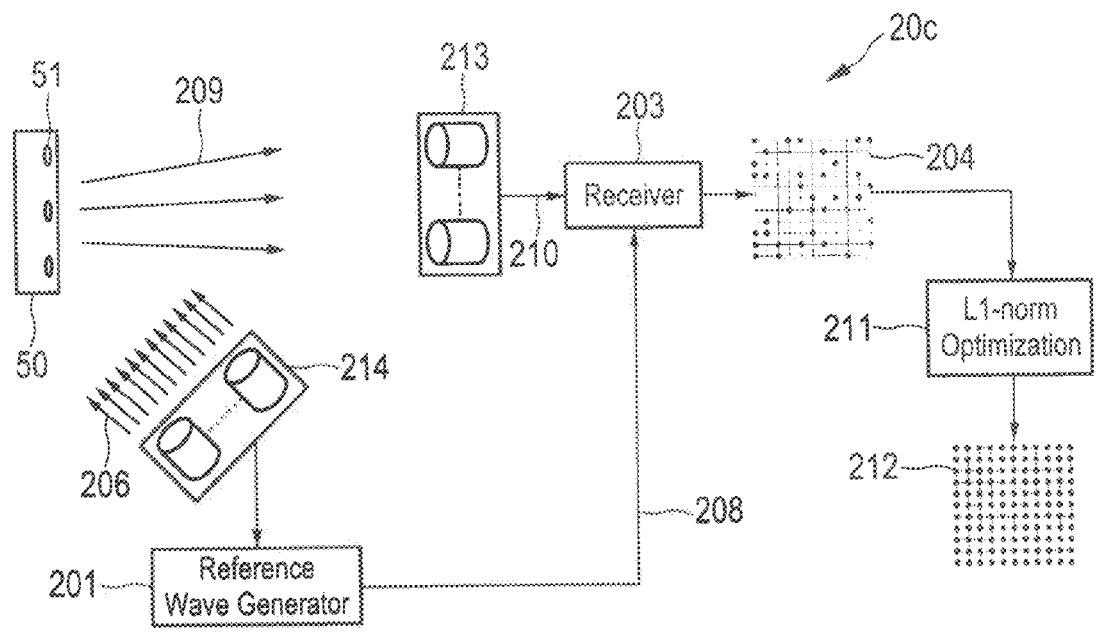
FIG. 7 shows a schematic block diagram of a third embodiment of an indirect radar holography apparatus according to the present invention.

As explained above, the setup of the apparatus might be inverted and applied to the illuminating antenna 200 instead of the detection antenna 202 or using a combination of both. One possible embodiment 20c of the apparatus in this case is shown in FIG. 7 with a multiple antenna array 214 at the transmitter and a multiple antenna array 213 at the receiver. This can also be fulfilled by using single moving antennas at the transmitter and/or the receiver or by the use of a moving reflector near the antenna elements or any combination.

After the measurements in y are acquired according to the sub-sampling matrix Φ, dense (regularly sampled) intensity measurements 212 are reconstructed. The reconstruction of the regularly intensity pattern Î is performed using l1-norm optimization (minimization) algorithm as done in embodiments of compressive sensing. The main idea is to find a sparsifying transformation where the measured intensity patterns are sparse and at which the reconstruction of an image can be performed. This sparsifying transformation should also take the properties of the hologram into account. In one preferred embodiment, the total variation (TV) operator is used. The total variation is the two-dimensional gradient of the hologram. The total variation is defined as $$TV(I) = \|(D_h + j \cdot D_v)I\|_1, \quad (2)$$

where I is the intensity pattern as described above, $D_h$ and $D_v$ are the horizontal and vertical gradients of I, $j = \sqrt{-1}$ and $\|\cdot\|_1$ is the l1-norm. Therefore, the constrained optimization function that can construct the hologram is $$\hat{I} = \underset{I}{\mathrm{argmin}}(TV(I)) \text{ such that } \Phi \cdot i = y, \quad (3)$$

where Î is the regularly sampled intensity pattern 212 to be reconstructed, while Φ, i and y are as described above.

The TV is one possible sparsifying transformation of the intensity pattern that can be used according to the present invention. Other transformations can also be applied as long as they preserve the hologram. One further example how to preserve the hologram is to use the fact that it is a piece-wise smooth surface. In other words, the jumps and the high variations occur at the edges of hologram while it is smooth everywhere else. Another example is to assume sparseness with transformations like Fourier, wavelet, curvelet or any combination of these transformations. These are examples that can be used by the skilled person, but are not to limit the scope of this invention.

To construct Î, any l1-norm optimization algorithm like basis pursuit, non-linear conjugate gradient or any similar l1-norm optimization algorithm can be used, as, for instance, described in the above cited papers of Donoho and Candes. Other types of reconstruction algorithms like the L0-norm optimization schemes or any construction algorithm suitable for reconstruction in compressive sensing can be used as well.

Once the above steps are performed, the image reconstruction can be performed using the constructed scalar intensity pattern Î as done in indirect holography, i.e. Fourier transform followed by some filtering operations and then conducting near-field to far-field transformation at a specified distance z from the antenna.

Figure 8:
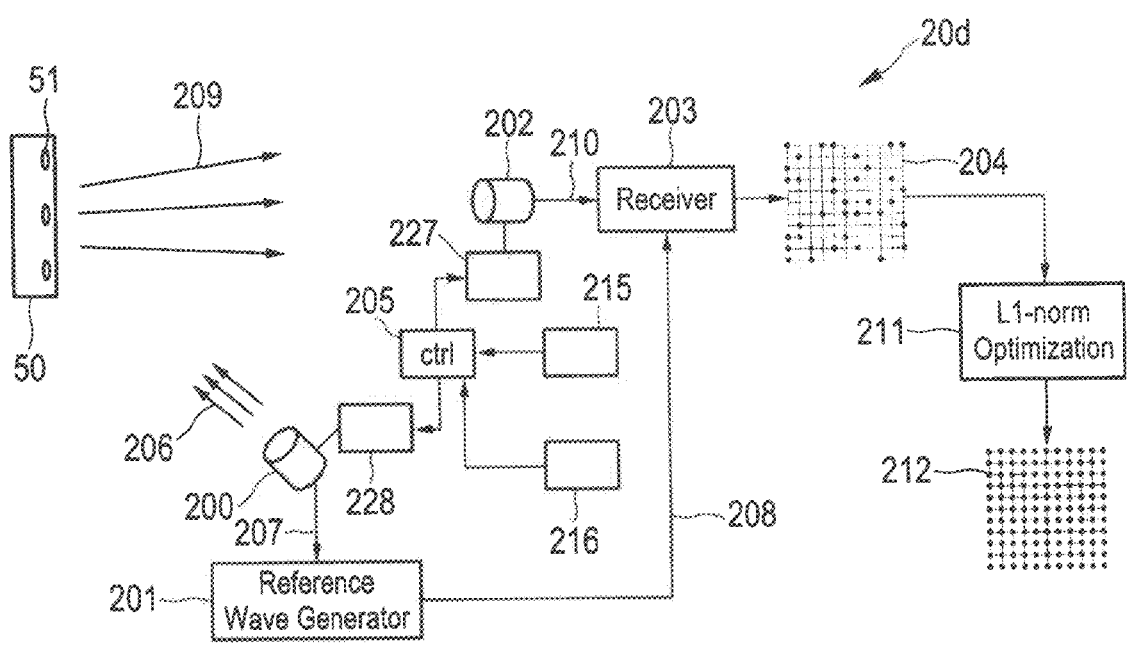
FIG. 8 shows a schematic block diagram of a fourth embodiment of an indirect radar holography apparatus according to the present invention.

A schematic block diagram of a further embodiment 20d of an indirect radar holographic apparatus is shown in FIG. 8. It is based on the embodiment 20a shown in FIG. 2, but in addition comprises a memory 215 and or a position generator 216. The memory 215 stores one or more lists of positions of spots, from which radiation shall be detected, wherein said positions are irregularly distributed, so that the control unit simply takes those positions from the memory 215 and controls the detection antenna 202 to detect the radiation from the respective spots 51 at said positions of the scene 50. Alternatively, the position generator 216 determines the positions of said plurality of irregularly distributed spots from the entire scene to be imaged by use of a predetermined function or distribution, in particular a uniform Bernoulli or Gaussian distribution, and provides the generated positions to the control unit 205 for controlling the detection antenna 202 accordingly.

As mentioned above, rather than controlling the detection antenna 202, the illumination antenna 200 can be controlled according to the same principle in addition to and/or instead of the detection antenna 202. Hence, separate lists of the positions for illumination may then be stored in the memory 215 or separate functions for generating the illumination positions may then be provided in the position generator 216.

Further, as shown in FIG. 8 for controlling the antennas 200, 202 a spot movement means 227, 228 is provided for effecting a movement of the spot 51, from which the radiation is detected, to various irregularly distributed positions distributed across the whole scene to be imaged. As an example, a mechanic spot movement unit 227, e.g. a motor, is provided for effecting a relative movement of the radiation detection unit 202 with respect to the scene 50 for effecting a movement of said spot 51. Further, as an example an electronic spot movement unit 228 is provided for electronically moving the sensitivity profile of the illumination antenna 200, for instance an electronic beam positioning means or an electronic beam forming means. Of course, for both antennas 200, 202 mechanic and/or electronic spot movement means may be provided.

Figure 9:
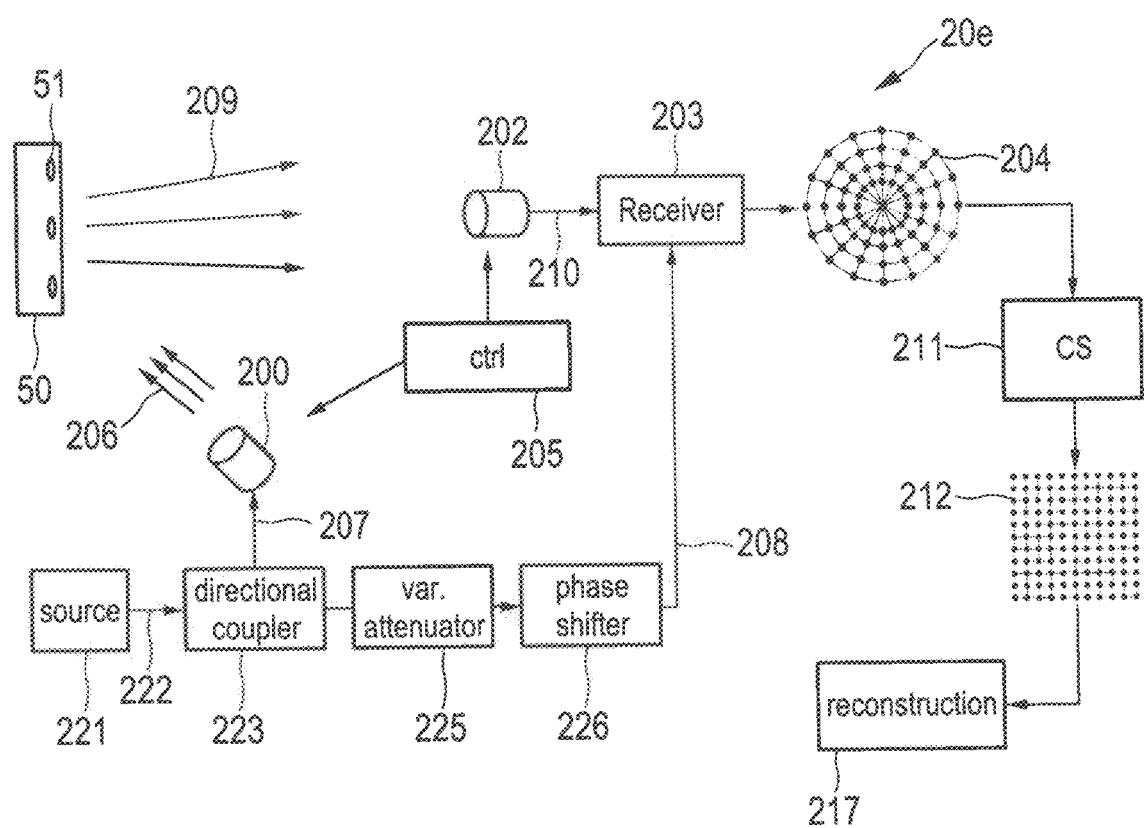
FIG. 9 shows a schematic block diagram of a fifth embodiment of an indirect radar holography apparatus according to the present invention

A schematic block diagram of a still further embodiment 20e of an indirect radar holographic apparatus is shown in FIG. 9. It is based on the embodiment 20a shown in FIG. 2, but in addition comprises a reconstruction unit 217 for reconstructing an image from the reconstructed regularly sampled intensity signals 212. From these intensity signals 212 an image can be reconstructed in an image reconstruction unit 220 by use of known algorithms, e.g. combination of filtering with a back projection or back propagation algorithm. If needed, the processing unit 211, may—in addition to a compressive sensing unit 211—comprise a regridding and/or interpolation unit for regridding and/or interpolation of the low density signal pattern 204 onto a rectangular (e.g. Cartesian) sampling grid for easier application of known reconstruction algorithms.

FIG. 9 also shows more details of the generation of the reference signal 208. In particular, a illumination signal source 221 is provided for generating a source signal 222, which is provided to a directional coupler 223, where the source signal 222 is split into two coherent parts. One part of the source signal 222, i.e. the illumination signal 208, is provided to the illumination antenna 200 for illuminating the scene 50. The other part 224 of the source signal 222 is used to generate the reference signal 208. The required form of reference wave, constant amplitude and linearly increasing phase shift can be provided using a phase shifter 224 and variable attenuator 226.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. Indirect radar holography apparatus for scanning a scene and generating a high-density signal pattern representing said scene, said apparatus comprising:
    an illumination means for illuminating said scene with radiation according to an illumination signal,
    a reference signal generation means for generating a reference signal from said illumination signal,
    a radiation detection means for detecting radiation emitted in a predetermined spectral range from a spot of said scene and for generating a radiation signal per spot from said detected radiation,
    a control means for controlling said illumination means and/or said radiation detection means so that radiation is detected at a number of spots distributed over the scene, wherein said number is lower than the number of intensity signals of said high-density signal pattern,
    a signal combination means for combining said radiation signals generated from the radiation detected at said number of spots and said reference signals to obtain a low-density signal pattern of intensity signals, and
    a processing means for processing the intensity signals of said low-density signal pattern and for generating said high-density signal pattern by applying compressive sensing to said low-density signal pattern.

2. Indirect radar holography apparatus as claimed in claim 1,
    wherein said processing means is adapted for applying a l1-norm minimization algorithm to said intensity signals of said low-density signal pattern.

3. Indirect radar holography apparatus as claimed in claim 1,
    wherein said control means is adapted for controlling said illumination means and/or said radiation detection means so that radiation is detected at a number of spots irregularly distributed over the scene.

4. Indirect radar holography apparatus as claimed in claim 3, wherein said processing means is adapted for reconstructing a regular sampled signal pattern of intensity signals from said sampled signal pattern of irregularly sampled intensity signals.

5. Indirect radar holography apparatus as claimed in claim 1,
wherein said reference signal generation means is adapted for applying predetermined changes of phase, in particular of phase and amplitude, to said illumination signal for generating said reference signal.

6. Indirect radar holography apparatus as claimed in claim 1,
wherein said signal combination means is adapted for adding the radiation signals and said reference signal and for squaring a sum of the added radiation signals and the reference signal.

7. Indirect radar holography apparatus as claimed in claim 1,
further comprising reconstruction means for reconstructing an image from said processed intensity signals.

8. Indirect radar holography apparatus as claimed in claim 1,
further comprising a spot movement means for effecting a movement of the spot, from which the radiation is detected, to various distributed positions of said scene.

9. Indirect radar holography apparatus as claimed in claim 1,
wherein said spot movement means comprises mechanic spot movement means for effecting a relative movement of the illumination means and/or the radiation detection means with respect to the scene for effecting a movement of said spot, in particular for mechanically moving the illumination means and/or the radiation detection means for effecting a movement of said spot.

10. Indirect radar holography apparatus as claimed in claim 1, wherein said spot movement means comprises electronic spot movement means for electronically moving the sensitivity profile of said illumination means and/or the radiation detection means for effecting a movement of said spot, in particular an electronic beam positioning means or an electronic beam forming means.

11. Indirect radar holography apparatus as claimed in claim 1,
further comprising a memory for storing one or more lists of positions of spots, from which radiation shall be detected, wherein said control means is adapted for selecting the positions of said plurality of distributed spots from one of said lists.

12. Indirect radar holography apparatus as claimed in claim 1,
further comprising position generation means for determining the positions of said plurality of distributed spots by use of a predetermined function or sampling distribution, in particular a uniform Bernoulli or Gaussian distribution.

13. Indirect radar holography apparatus as claimed in claim 1,
wherein said illumination means comprises a single illumination unit or a line or array of illumination units, in particular a single illumination antenna or a line or array of illumination antennas, for illuminating said scene with radiation.

14. Indirect radar holography apparatus as claimed in claim 1,
wherein said radiation detection means comprises a single radiation detection unit or a line or array of radiation detection units, in particular a single radiation detection antenna or a line or array of radiation detection antennas, for detecting radiation emitted from a single spot or from a line or array of spots.

15. Indirect radar holography apparatus as claimed in claim 1,
wherein said control means is adapted for controlling said illumination means and/or said radiation detection means so that the number of radiation signals of said low-density signal pattern is by a factor in the range from 10% to 90%, in particular in the range from 25% to 75%, lower than the number of intensity signals of said high-density pattern.

16. Indirect radar holography method for scanning a scene and generating a high-density signal pattern representing said scene, said method comprising the steps of:
illuminating said scene with radiation according to an illumination signal,
generating a reference signal from said illumination signal,
detecting radiation emitted in a predetermined spectral range from a spot of said scene,
generating a radiation signal per spot from said detected radiation,
controlling said illumination means and/or said radiation detection means so that radiation is detected at a number of spots distributed over the scene, wherein said number is lower than the number of intensity signals of said high-density signal pattern,
combining said radiation signals generated from the radiation detected at said number of spots and said reference signals to obtain a low-density signal pattern of intensity signals, and
processing the intensity signals of said low-density signal pattern and for generating said high-density signal pattern by applying compressive sensing to said low-density signal pattern.

17. Computer readable non-transitory medium having instructions stored thereon which, when carried out on a computer, cause the computer to perform the steps of controlling, combining and processing of the method as claimed in claim 16.

18. Indirect radar holography apparatus for scanning a scene and generating a high-density signal pattern representing said scene, said apparatus comprising:
an illuminator that illuminates said scene with radiation according to an illumination signal,
a reference signal generator that generates a reference signal from said illumination signal,
a radiation detector that detects radiation emitted in a predetermined spectral range from a spot of said scene and generates a radiation signal per spot from said detected radiation,
a controller that controls said illuminator and/or said radiation detector so that radiation is detected at a number of spots distributed over the scene, wherein said number is lower than the number of intensity signals of said high-density signal pattern,
a signal combiner that combines said radiation signals generated from the radiation detected at said number of spots and said reference signals to obtain a low-density signal pattern of intensity signals, and
a processor that processes the intensity signals of said low-density signal pattern and generates said high-density signal pattern by applying compressive sensing to said low-density signal pattern.

* * * * *